United States Patent
Singh

(10) Patent No.: US 10,397,252 B2
(45) Date of Patent: Aug. 27, 2019

(54) DYNAMIC DETECTION OF UNAUTHORIZED ACTIVITY IN MULTI-CHANNEL SYSTEM

(71) Applicant: Bank of America Corporation, Charlotte, NC (US)

(72) Inventor: Awadhesh Pratap Singh, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 119 days.

(21) Appl. No.: 15/782,933

(22) Filed: Oct. 13, 2017

(65) Prior Publication Data

US 2019/0116192 A1   Apr. 18, 2019

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 6,321,338 B1 * | 11/2001 | Porras | H04L 41/142 709/224 |
| 7,089,241 B1 | 8/2006 | Alspector et al. | |
| 7,711,779 B2 | 5/2010 | Goodman et al. | |
| 8,041,592 B2 * | 10/2011 | Lopez | G06F 21/552 705/7.11 |
| 8,094,803 B2 | 1/2012 | Danson et al. | |
| 8,401,529 B1 | 3/2013 | Delker et al. | |
| 8,521,132 B2 | 8/2013 | Washio | |
| 8,682,812 B1 * | 3/2014 | Ranjan | H04L 63/1425 706/12 |
| 9,112,895 B1 * | 8/2015 | Lin | H04L 63/1416 |
| 9,167,078 B2 | 10/2015 | Spievak et al. | |
| 9,686,402 B2 | 6/2017 | Hodge | |
| 2002/0194255 A1 * | 12/2002 | Hellenthal | G06F 21/604 709/200 |

(Continued)

*Primary Examiner* — Ponnoreay Pich
(74) *Attorney, Agent, or Firm* — Banner & Witcoff, Ltd.; Michael A. Springs

(57) ABSTRACT

Systems for dynamically detecting unauthorized activity are provided. A system may receive data from one or more computing devices associated with one or more different channels of communication (e.g., email, telephone, instant messaging, internet browsing, and the like). The received data may be formatted or transformed from an unstructured format to a structured format for further analysis and evaluation. In some arrangements, machine learning may be used to determine whether triggering content was identified in data received from the one or more systems and to evaluate the identified triggering content to determine whether the content, alone or in combination with triggering content from other channels of communication, may indicate an occurrence of unauthorized activity. If so, the identified occurrence may be evaluated to determine whether a false positive has occurred. If a false positive has not occurred, an alert or notification may be generated and/or operation or functionality one or more communication channels may be modified.

24 Claims, 10 Drawing Sheets

(56) References Cited

U.S. PATENT DOCUMENTS

| | | | |
|---|---|---|---|
| 2007/0058540 A1* | 3/2007 | Kay | H04L 63/1416 |
| | | | 370/230 |
| 2011/0131324 A1* | 6/2011 | Chaturvedi | H04L 63/20 |
| | | | 709/225 |
| 2015/0341379 A1* | 11/2015 | Lefebvre | H04L 63/1425 |
| | | | 726/22 |
| 2016/0219070 A1* | 7/2016 | Vasseur | H04L 45/306 |
| 2018/0219885 A1* | 8/2018 | Ahmadzadeh | H04L 63/1425 |

* cited by examiner

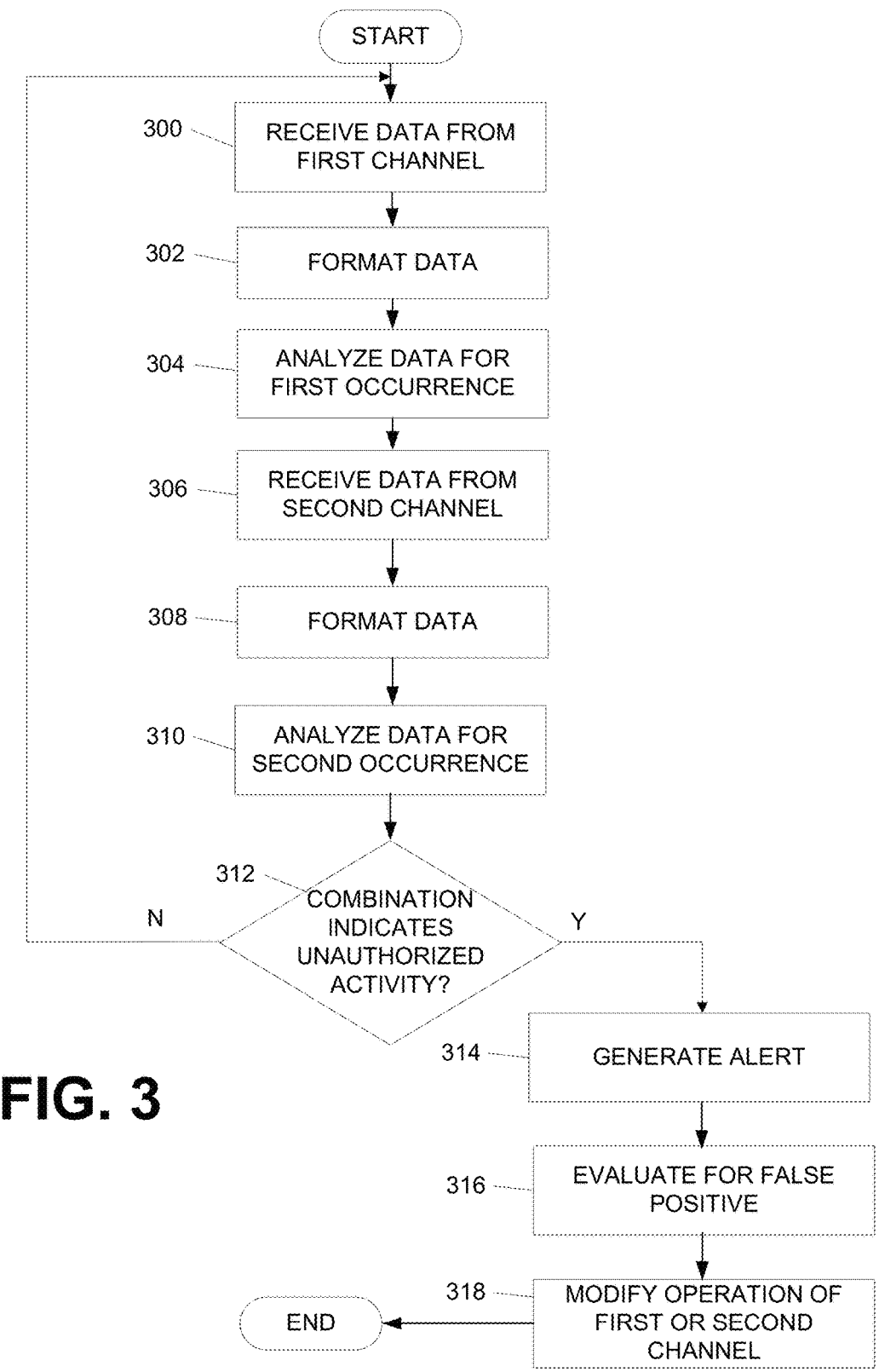

DYNAMIC DETECTION OF UNAUTHORIZED ACTIVITY IN MULTI-CHANNEL SYSTEM

BACKGROUND

Aspects of the disclosure relate to electrical computers, systems, and machine learning. In particular, one or more aspects of the disclosure relate to using machine learning to dynamically evaluate data received via multiple channels to identify potential unauthorized activity.

Identify potential threats (e.g., cybersecurity threats, and the like) is an important part of conducting business. However, identifying these potential threats can be difficult when a threat is being implemented via different channels of communication (e.g., email, chat, instant message, text, telephone, web activity, and the like). Further, even if a threat can be quickly identified, taking action quickly to avoid further communication associated with the threat can be critical to avoiding an issue or mitigating an impact of an issue. Accordingly, systems for evaluating data from multiple different channels of communication and quickly and efficiently identifying potential threats and modifying operation of one or more systems in response to a potential threat may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with identifying potential unauthorized activity, evaluating the potential unauthorized activity, modifying operation of a channel of communication in response to potential unauthorized activity, and the like.

In some examples, a system, computing platform, or the like, may receive data from one or more computing systems, devices, or the like associated with one or more different channels of communication (e.g., email, telephone, instant messaging, internet browsing, and the like). In some examples, the received data may be formatted or transformed from an unstructured format to a structured format for further analysis and evaluation.

In some arrangements, machine learning may be used to determine whether triggering content was identified in data received from the one or more systems, devices, or the like. In some examples, machine learning may be used to evaluate the identified triggering content to determine whether the content, alone or in combination with triggering content from other channels of communication, may indicate an occurrence of unauthorized activity. If so, the identified occurrence may be evaluated to determine whether a false positive has occurred. If not, in some examples, an alert or notification may be generated and/or operation or functionality one or more communication channels may be modified.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an illustrative method for implementing and using a system to perform dynamic unauthorized activity detection functions, according to one or more aspects described herein;

DETAILED DESCRIPTION

Figure 1A:
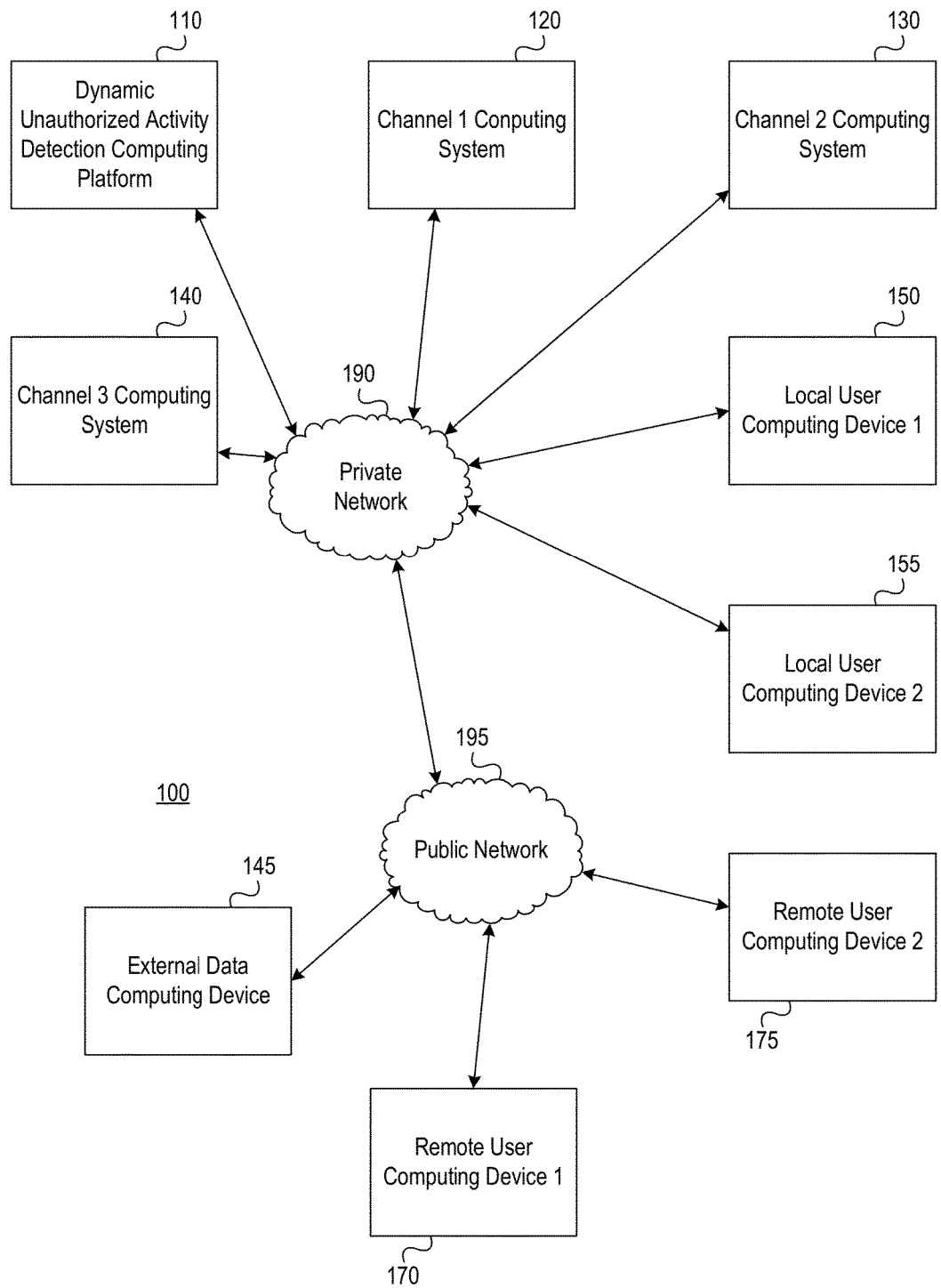
FIGS. 1A and 1B depict an illustrative computing environment for implementing dynamic unauthorized activity detection functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to dynamically evaluate data received from systems associated with multiple different types of communication channels (e.g., telephone, email, instant messaging, internet browsing, or the like) to determine whether potential unauthorized activity has occurred.

For many entities, identifying threats to the entity is an important function that requires vast, ever-changing resources. While many threats may come from outside an entity (e.g., via communications such as email, or the like), users within the entity may also undertake unauthorized activity. Because of the access some users may have to confidential information, the ability to modify data, and the like, it is important to identify any potential threats quickly and take immediate action to avoid an issue or mitigate an impact of the issue.

Accordingly, aspects described herein provide for dynamic unauthorized activity detection functions. In some examples, data may be received from one or more computer systems or devices associated with different channels of communication (e.g., different types of communication, such as email, instant messaging, internet browsing, and the like). In some examples, external data may also be received, such as current market information, and the like.

In some examples, machine learning may be used to identify triggering terms (e.g., terms within the data received from the plurality of channels that may indicate unauthorized activity) and may evaluate the terms, alone and in combination, to determine whether unauthorized activity has occurred. Accordingly, if data from one channel of communication includes one term that may or may not be associated with unauthorized activity and data from a second, different channel of communication includes a second term that may or may not be associated with unauthorized activity, the system may evaluate each term separately and in combination to determine whether the terms alone or in combination indicate unauthorized activity.

In some arrangements, an indication of unauthorized activity may be evaluated for a false positive. If the incident is not a false positive, a notification or alert may be generated and/or transmitted to a computing device for display. Further, in some examples, if the incident is not a false positive, a modification to functionality of one or more channels of communication for one or more users may be modified.

These and various other arrangements will be discussed more fully below.

Figure 1B:
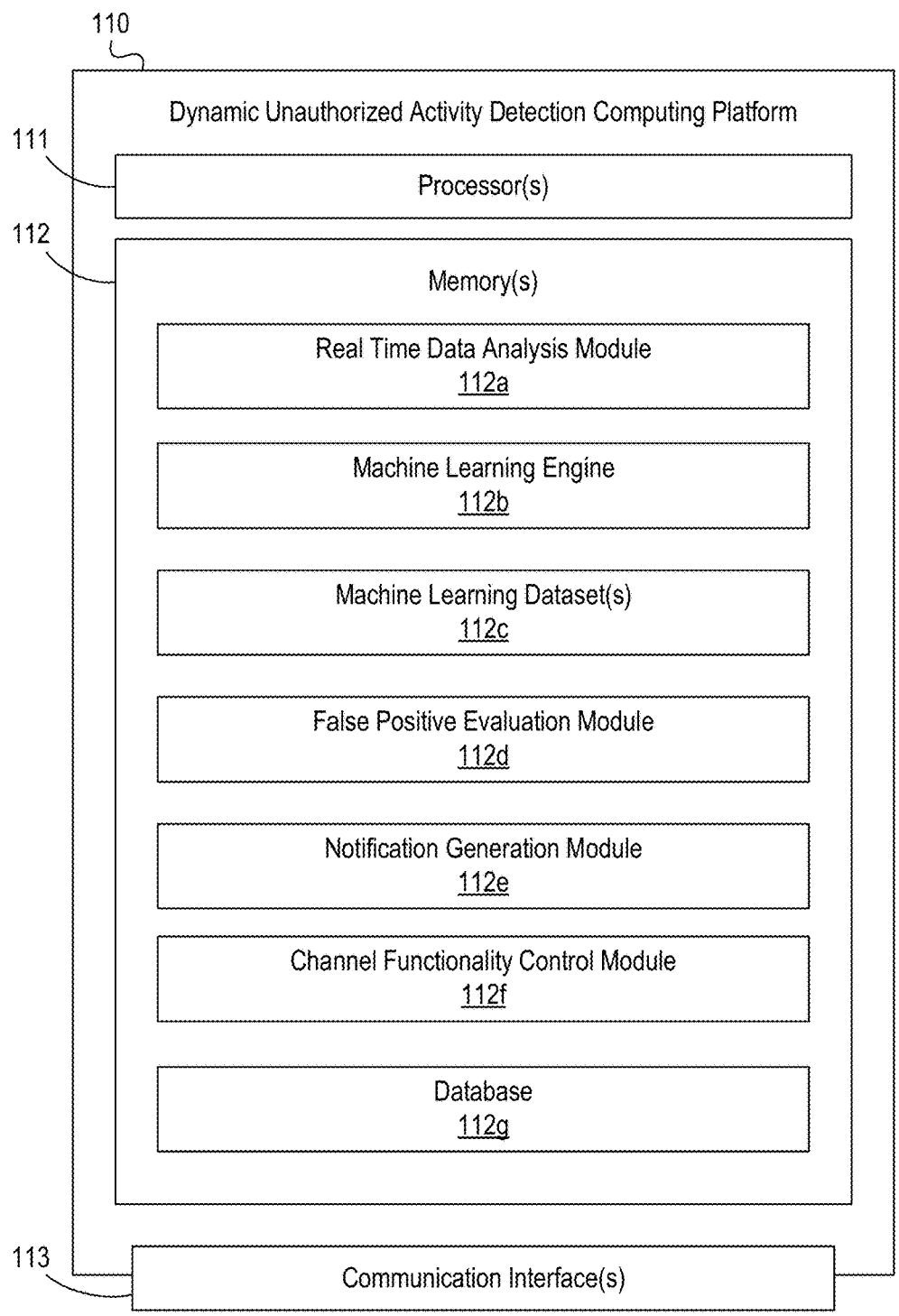

FIGS. 1A and 1B depict an illustrative computing environment for implementing and using a dynamic unauthorized activity detection computing system in accordance with one or more aspects described herein. Referring to FIG. 1A, computing environment 100 may include one or more computing devices and/or other computing systems. For example, computing environment 100 may include a dynamic unauthorized activity detection computing platform 110, first channel (or channel 1) computing system 120, a second channel (or channel 2) computing system 130, a third channel (or channel 3) computing system 140, an external data computing device 145, a first local user computing device 150, a second local user computing device 155, a first remote user computing device 170, and a second remote user computing device 175. More or fewer computing systems associated with various channels of communication may be used without departing from the invention.

Dynamic unauthorized activity detection computing platform 110 may be configured to host and/or execute a machine learning engine to provide dynamic unauthorized activity detection functions. In some examples, data may be received from a plurality of computing systems associated with a plurality of different types of communication channels. For instance, data may be received from a computing system associated with a first channel computing system 120, a second channel computing system 130, and/or a third channel computing system 140. Additional systems associated with additional channels of communication may also be included in the dynamic unauthorized activity detection system 100. In some examples, the various types of communication channels may include telephone, email, chat or other instant messaging system, internet browsing history, and the like. In some examples, external data may also be received, such as from an external data computing device 145. The external data may include publicly available information such as current market conditions, financial data, and the like.

The data may be received by the dynamic unauthorized activity detection computing platform 110 and may be analyzed to determine whether content received from one or more channels indicates potential unauthorized activity. In some examples, content from a first channel may be combined with content received from a second channel to indicate a potential unauthorized activity. In some arrangements, machine learning may be used to extract terms from data received from one or more channels and identify potential unauthorized activity.

First channel computing system 120, second channel computing system 130, and third channel computing system 140, may be any type of computer system performing various functions, for example, within an entity. For instance, first channel computing system 120, second channel computing system 130, and/or third channel computing system 140, may be or include one or more computing devices associated with a user (e.g., an employee) of the entity. The first channel computing system 120, second channel computing system 130, and/or third channel computing system 140, may include computing devices used on a daily basis by an associated user in the course of performing one or more business functions for the entity. In another example, first channel computing system 120, second channel computing system 130, and/or third channel computing system 140, may include systems and/or devices configured to monitor data exchanged via the various communication channels from one or more user computing devices on which the user may perform one or more business functions. Accordingly, the first channel computing system 120, second channel computing system 130, and third channel computing system 140, may include a telephone system of the entity, email system of the entity, chat or other instant messaging system of the entity, internet usage of users within the entity, and/or systems that may monitor those systems.

External data computing device 145 may be configured to store, transmit, and/or receive data associated with one or more data or computer systems external to the entity implementing the dynamic unauthorized activity detection computing platform 110. For instance, data, such as publicly available data, current market condition data, historical market condition data, general business information, recently discovered cyber threats, and the like, may be transmitted to the dynamic unauthorized activity detection computing platform 110 via, for example, external data computing device 145.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be associated with one or more users within the entity and may be used by the users in the course of performing business functions. The local and remote user computing devices 150, 155, 170, 175, may include access to systems such as telephone, email, chat or other instant messaging service, internet browsing, and the like. Accordingly, data from these various channels of communication may be monitored and/or collected by a system (e.g., systems 120, 130, 140, and the like) associated with a particular channel of communication.

In one or more arrangements, first channel computing system 120, second channel computing system 130, and third channel computing system 140, external data computing device 145, local user computing device 150, local user computing device 155, remote user computing device 170, and/or remote user computing device 175 may be any type of computing device or combination of devices capable of performing the particular functions described herein. For example, first channel computing system 120, second channel computing system 130, and third channel computing system 140, external data computing device 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first channel computing system 120, second channel computing system 130, and third channel computing system 140, external data computing device 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic unauthorized activity detection computing platform 110. As illustrated in greater detail below, dynamic unauthorized activity detection computing platform 110 may include one or more computing devices configured to perform one or more of the functions described herein. For example, dynamic unauthorized activity detection computing platform 110 may include one or more computers (e.g., laptop computers, desktop computers, servers, server blades, or the like).

As mentioned above, computing environment 100 also may include one or more networks, which may interconnect one or more of dynamic unauthorized activity detection computing platform 110, first channel computing system 120, second channel computing system 130, and third channel computing system 140, external data computing device 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic unauthorized activity detection computing platform 110, first channel computing system 120, second channel computing system 130, and third channel computing system 140, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic unauthorized activity detection computing platform 110, first channel computing system 120, second channel computing system 130, and third channel computing system 140, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic unauthorized activity detection computing platform 110, first channel computing system 120, second channel computing system 130, and third channel computing system 140, local user computing device 150, local user computing device 155) with one or more networks and/or computing devices that are not associated with the organization. For example external data computing device 145, remote user computing device 170, and/or remote user computing device 175 might not be associated with an organization that operates private network 190 (e.g., because external data computing device 145, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing device 145, remote user computing device 170 and remote user computing device 175 to private network 190 and/or one or more computing devices connected thereto (e.g., dynamic unauthorized activity detection computing platform 110, first channel computing system 120, second channel computing system 130, and third channel computing system 140, local user computing device 150, local user computing device 155).

Referring to FIG. 1B, dynamic unauthorized activity detection computing platform 110 may include one or more processors 111, memory 112, and communication interface 113. A data bus may interconnect processor(s) 111, memory 112, and communication interface 113. Communication interface 113 may be a network interface configured to support communication between dynamic unauthorized activity detection computing platform 110 and one or more networks (e.g., private network 190, public network 195, or the like). Memory 112 may include one or more program modules having instructions that when executed by processor(s) 111 cause dynamic unauthorized activity detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic unauthorized activity detection computing platform 110 and/or by different computing devices that may form and/or otherwise make up dynamic unauthorized activity detection computing platform 110.

For example, memory 112 may have, store, and/or include a real-time data analysis module 112a. Real-time data analysis module 112a may store instructions and/or data that may cause or enable the dynamic unauthorized activity detection computing platform 110 to receive data from one or more sources, such as first channel computing system 120, second channel computing system 130, third channel computing system 140, and the like. In some examples, each computing system of first channel computing system 120, second channel computing system 130, third channel computing system 140 may monitor one or more computing devices (e.g., user computing devices such as local user computing device 150, local user computing device 155, remote user computing device 170, remote user computing device 175, or the like). The computing systems, (e.g., channel 1 computing system 120, channel 2 computing system 130, channel 3 computing system 140) may monitor the one or more computing devices and capture data from the one or more channels of communication being monitored. In some examples, the data may be captured and analyzed in real-time (e.g., within 3, 5, 10, 30, 60, or the like, seconds of the data being transmitted via the respective channel).

The data may be received and, in some examples, may be formatted or transformed for further analysis. For instance, data may be received from the plurality of channels (e.g., email, phone, chat, internet history, or the like) in a native or raw format. In some examples, the native format may be an unstructured format. Accordingly, the data may be formatted or transformed to a structured format for further evaluation, in at least some examples.

Dynamic unauthorized activity detection computing platform 110 may further have, store and/or include a machine learning engine 112b and machine learning datasets 112c. Machine learning engine 112b and machine learning datasets 112c may store instructions and/or data that cause or enable dynamic unauthorized activity detection computing platform 110 to dynamically evaluate real-time data received from one or more different channels of communication (e.g., email, chat, phone, Internet browsing, and the like) to determine whether content within one or more communications (e.g., from a single channel or from multiple channels) include potential unauthorized activity. The machine learning datasets 112c may be generated from previous unauthorized activity detected (e.g., based on historical data) and may be revised and/or validated based on subsequent data received.

The machine learning engine 112b may receive data (e.g., channel 1 computing system 120, channel 2 computing system 130, channel 3 computing system 140, external data computing device 145, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms (e.g., query clustering, probabilistic clustering, and the like), artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more terms, words, phrases, or the like (e.g., as identified in communications from one or more different communication channels) to incidents of unauthorized activity. For instance, data from previously identified incidents of unauthorized activity (e.g., terms used, browsing history, or the like) may be used to generate one or more machine learning datasets 112c linking terms, words, or the like, to unauthorized activity or a likelihood of unauthorized activity. These datasets may be used to evaluate incoming data from a plurality of different channels to determine whether an incident of unauthorized activity is likely.

The machine learning datasets 112c may be updated and/or validated based on the data received from the one or more systems and/or devices. For instance, as additional or subsequent data is received, the machine learning datasets 112c may be validated and/or updated based on the newly received information (e.g., confirmation of unauthorized activity, and the like). Accordingly, the system may continuously refine determinations made based on the machine learning datasets 112c.

Dynamic unauthorized activity detection computing platform 110 may further include a false positive evaluation module 112d. False positive evaluation module 112d may store instructions and/or data that may cause or enable the dynamic unauthorized activity detection computing platform 110 to evaluate incidents of potential unauthorized activity (e.g., as identified based on one or more machine learning datasets) to determine whether the incident may be a false positive (e.g., it may seem to be an incident or occurrence of unauthorized activity but it is not). In some examples, a false positive may be identified by determining a severity index or score. The severity index or score may be based on factors such as a score given to each term identified by the system as potentially being associated with unauthorized activity, a number of outliers or occurrences of abnormal words or activities across multiple channels, a score associated with a role of a user (e.g., if a user is a trader or has access to other high level financial information, the person may have a higher role score than a person who has limited access to data, cannot modify data, or the like, a number of repetitions of a term identified as potentially associated with unauthorized activity, an historical score of a user multiplied by a number of outliers within a predetermined time period, a false positive score against a fake alert, and the like. In some examples, the severity index or score may be determining using:

Index=Current Score+Outliers+Role Score+Repetition+(Historical Score*Outliers)−False Positive Score The index may then be compared to one or more thresholds to determine whether the score is greater than the threshold. If so, an alert may be generated and transmitted and/or functionality for a particular channel maybe modified, as will be discussed more fully herein.

In some examples, the threshold may be set for different groups, departments, organizations, levels, roles, or the like, within an entity. For instance, in some examples, a threshold may be set at a business unit level. Accordingly, for users within that business unit, a threshold may be set for what constitutes a false positive. If over that threshold, the occurrence is not likely a false positive and a notification may be generated. In some examples, different business units may have different thresholds.

In other examples, the threshold may be set at a group level. For instance, each business unit may include a plurality of groups. Accordingly, a threshold for a false positive maybe set for each group within the business unit and may be different for different groups.

In still other examples, the threshold may be set for different roles performed by users. For instance, a user in a role in which he or she has access to substantial information may be different from a threshold set for a user in a role in which he or she does not access substantial information.

In yet other examples, the threshold may be set on an alert level. For instance, the threshold may be determine based on whether an alert will be generated, a type of alert, or the like.

The dynamic unauthorized activity detection computing platform 110 may further have, store and/or include a notification generation module 112e. The notification generation module 112e may store instructions and/or data that may cause or enable the dynamic unauthorized activity detection computing platform 110 to generate one or more notifications indicating that potential unauthorized activity has been detected. In some examples, the alert may include the one or more channels from which data was extracted to identify the potential unauthorized activity, one or more users associated with the occurrence, and the like. The alert may be transmitted to a user computing device, such as local user computing device 150, 155, remote user computing device 170, 175, or the like.

The dynamic unauthorized activity detection computing platform 110 may further have, store and/or include a channel functionality/control module 112f. The channel functionality/control module 112f may store instructions and/or data that may cause or enable the dynamic unauthorized activity detection computing platform 110 to modify functionality associated with one or more channels for one or more users. For instance, if an occurrence of potential unauthorized activity is identified (e.g., based on one or more machine learning datasets) and data was extracted from one or more channels of communication, the system may transmit a signal, command or instruction to modify the functionality of that system for that user. For instance, the channel functionality/control module 112f may transmit a signal, command or instruction to one or more of channel 1 computing system 120, channel 2 computing system 130, channel 3 computing system 140, or the like, to reduce or prevent access to the channel for an identified user. In some examples, access to all channels may be prevented. In other examples, access to the channels in which the unauthorized activity was detected may be prevented.

In some examples, threshold levels may be determined for modifying a user's access to one or more channels of communication. For instance, the severity index or score may be compared to a second threshold which may be determined for each channel of communication. In some arrangements, each channel of communication may have a different threshold for modifying functionality. Accordingly, the index or score may be compared to each threshold and, if above a threshold, functionality for that channel may be modified. If not above, functionality might not be modified.

Dynamic unauthorized activity detection computing platform 110 may further include one or more databases 112g. The one or more databases 112g may store information related to previous occurrences of unauthorized activity, user information, and the like.

Figure 2A:
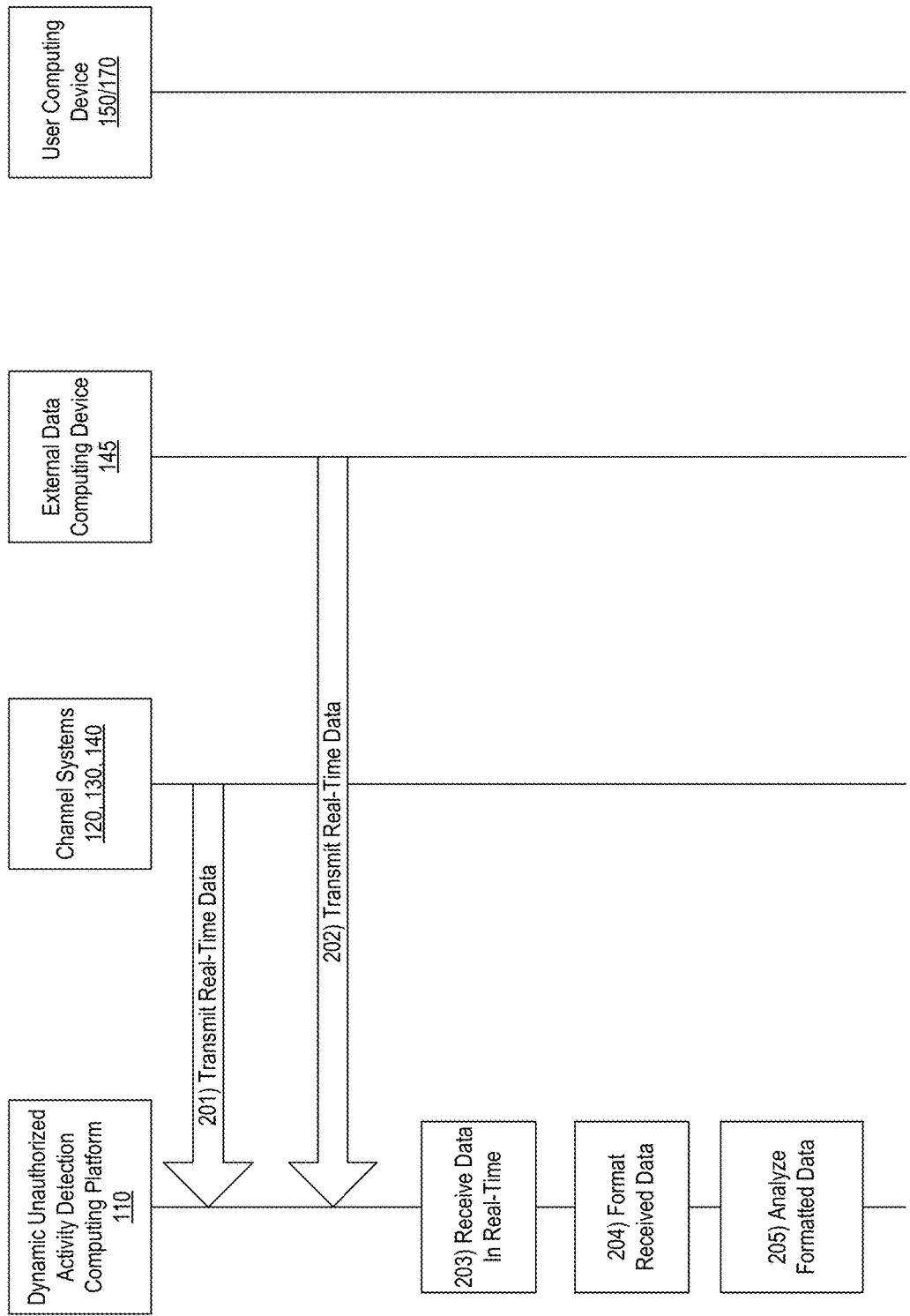
FIGS. 2A-2C depict an illustrative event sequence for implementing dynamic unauthorized activity detection functions in accordance with one or more aspects described herein.
Figure 2B:
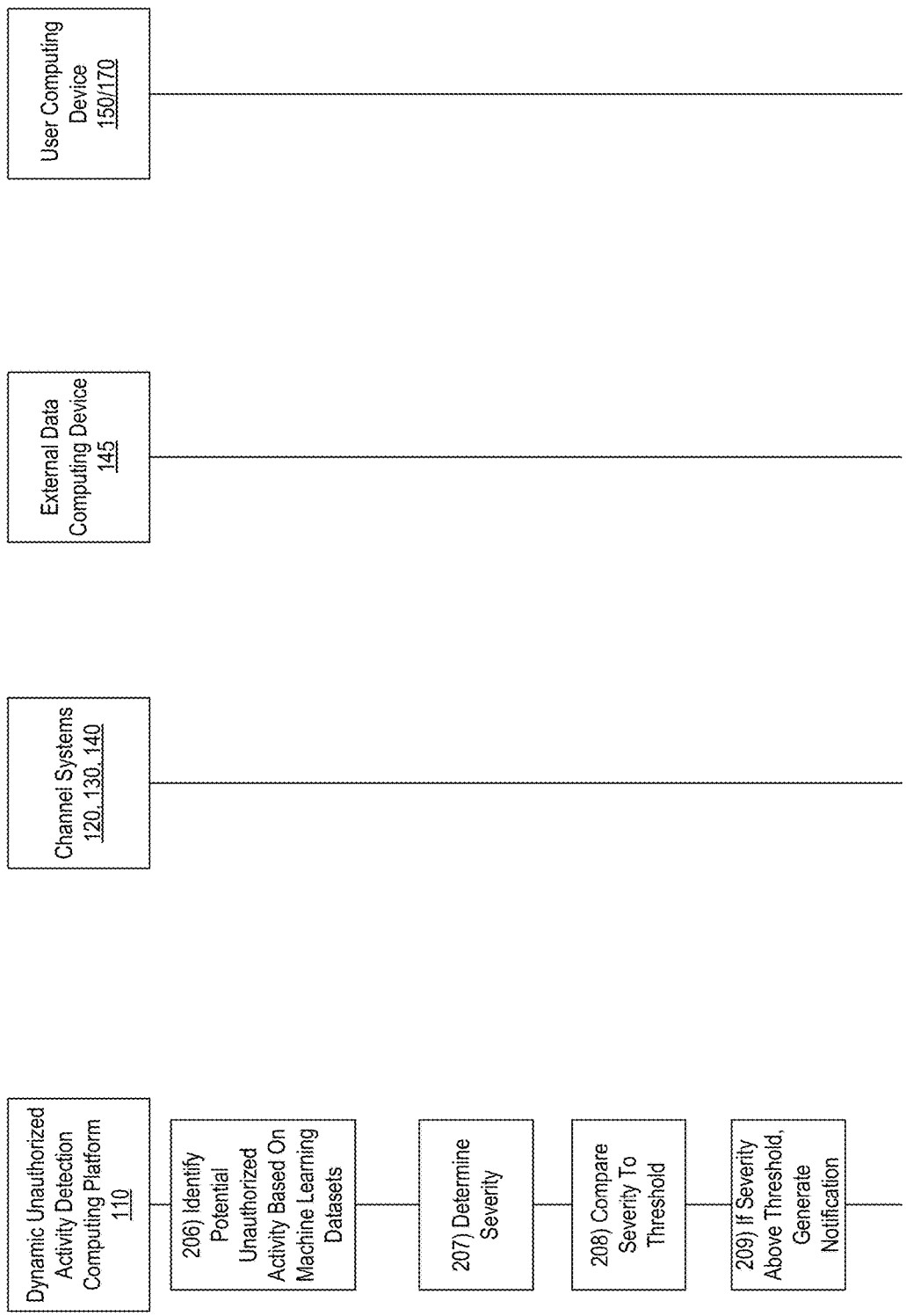
Figure 2C:
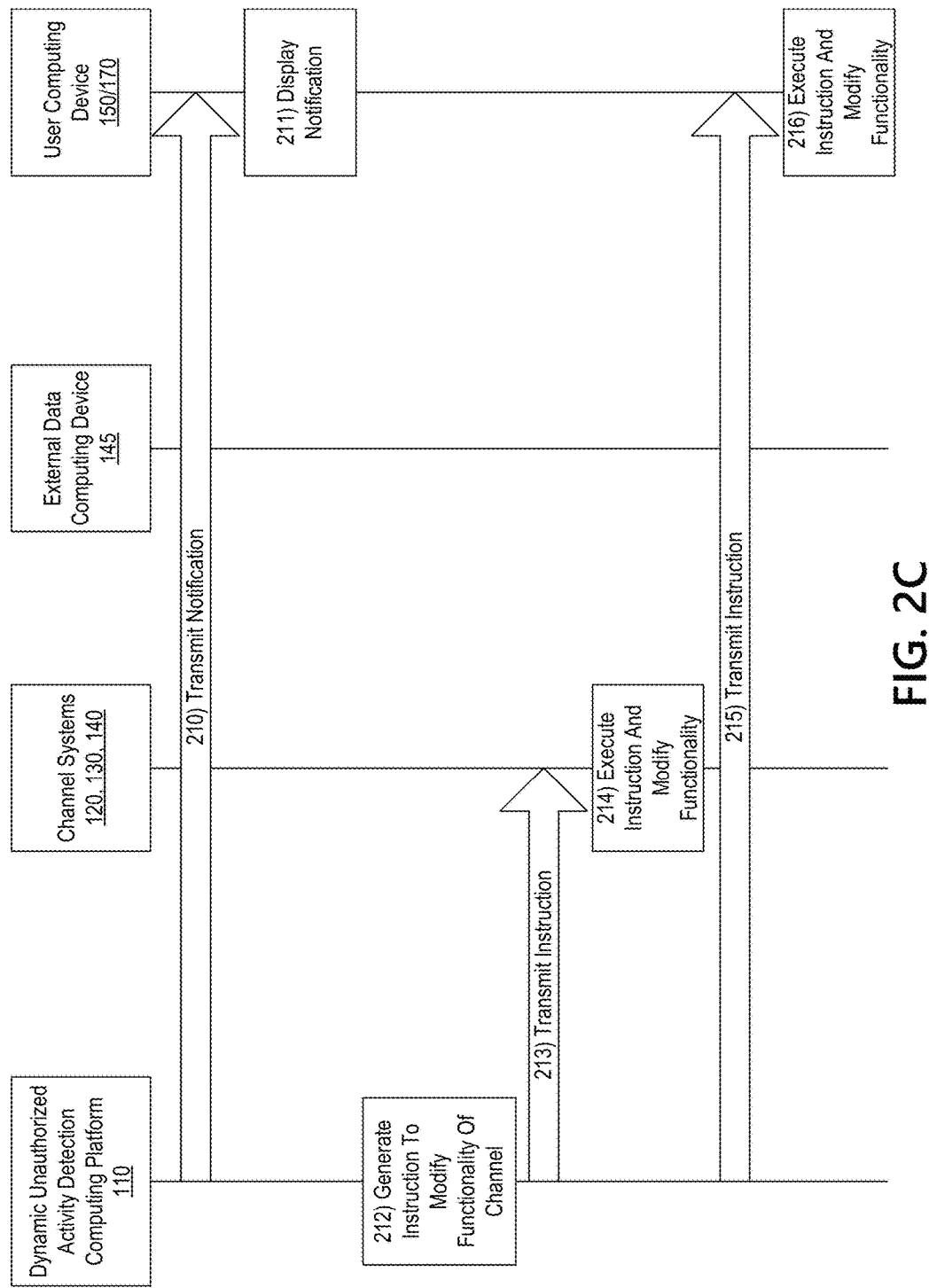

FIGS. 2A-2C depict an illustrative event sequence for implementing and using dynamic unauthorized activity detection functions in accordance with one or more aspects described herein. The events shown in the illustrative event sequence are merely one example sequence and additional events may be added, or events may be omitted, without departing from the invention.

Referring to FIG. 2A, at step 201, data may be transmitted from one or more computing systems associated with one or more channels of communication (e.g., channel 1 computing system 120, channel 2 computing system 130, channel 3 computing system 140, and the like) to the dynamic unauthorized activity detection computing platform 110. In some examples, the data may be transmitted in real-time or near real-time (e.g., within 5, 10, 15, 30, 60, or the like, seconds of the data being received by the computing system. In some examples, the computing systems 120, 130, 140 may monitor (e.g., in real-time, continuously, and the like) one or more computing devices operated by one or more users of an entity. Accordingly, as a user communicates via one or more communication channels (e.g., sends or received email, sends or receives chat or other instant message, browses the internet, has a telephone call) the data from the communication may be received and monitored by the computing systems 120, 130, 140. The computing systems 120, 130, 140 may then forward the data to the dynamic unauthorized activity detection computing platform 110.

In step 202, data may be transmitted from other sources, such as from external data computing device 145. The data may include current market conditions, known cyber threat information, current financial information, and the like.

In step 203, the data may be received in real-time and, in step 204, the data may be formatted or transformed from an unstructured format to a structured format. For instance, optical character recognition, voice recognition, and the like, may be used to identify terms in the data, format the data, and the like, for further analysis.

In step 205, the formatted data may be analyzed to identify one or more terms, phrases, activities, or the like, that may indicate potential unauthorized activity. For instance, the machine learning engine 112b may be used to extract or parse terms and to identify one or more terms that may indicate an occurrence of potential unauthorized activity. In some examples, a clustering algorithm may be used to evaluate terms across multiple channels. For example, if a cybersecurity threat is known as "Name 1 Name 2," the system may evaluate the received data to identify occurrences of "Name 1 Name 2" in a communication from a single channel and/or occurrences of "Name 1" and "Name 2" in the same channel or in different channels within a predetermined time period. For example, if data from a phone conversation includes "Name 1" and the same user sends an email including "Name 2" within a predetermined time period (e.g., 2 hours, one business day, 24 hours, or the like) the system may identify the combination of "Name 1" and "Name 2" as a potential threat, even if the terms were used via different communication channels (e.g., "Name 1" from a telephone conversation and "Name 2" from an instant message conversation, or the like). In some examples, an occurrence of each term may be flagged for potential unauthorized activity if the occurrences of each term are within a predetermined time period (e.g., one hour, one business day, 24 hours, or the like).

With reference to FIG. 2B, in step 206, a potential occurrence of unauthorized activity may be identified based on the analysis performed in step 205. For instance, based on one or more machine learning datasets, the evaluated data, terms, and the like, may be used to identify one or more occurrences of potential unauthorized activity.

In step 207, the identified occurrence of potential unauthorized activity may be evaluated to determine whether it is likely a false positive. For instance, the type of terms, frequency of term, type of user, and the like, may be used to determine whether the identified occurrence is likely a false positive. In some examples, as discussed above, a severity score or index may be generated to evaluate the likelihood of a false positive. As discussed above, the severity score or index may be determined based on the terms identified, type or role of user, repetition of terms, and the like.

In step 208, the determined severity score or index may be compared to a threshold. As discussed above, threshold may vary based on business unit, group, user role, and the like. If the determined score or index is below the threshold, the occurrence may be identified as a false positive. Alternatively, if the occurrence is at or above the threshold, a notification or alert may be generated in step 209. As discussed above, the alert or threshold may include terms identified as associated with the occurrence of potential unauthorized activity, one or more channels in which the terms were identified, a user associated with the occurrence, a role of a user, and the like.

With reference to FIG. 2C, in step 210, the notification or alert may be transmitted to a computing device, such as local user computing device 150, remote user computing device 170, or the like. In some examples, the notification or alert may be transmitted to a computing device associated with an administrator, supervisor, or the like. In step 211, the notification or alert may be displayed on the computing device 150, 170.

In step 212, the dynamic unauthorized activity detection computing platform 110 may generate an instruction to modify functionality of one or more channels of communication. For instance, the computing platform 110 may generate an instruction or command to disable functionality of one or more channels for one or more users (e.g., based on the identified occurrence of potential unauthorized activity). In step 213, the instruction may be transmitted to one or more computing systems associated with channels of communication (e.g., 120, 130, 140). In some examples, the instruction may be executed on one or more of computing systems 120, 130, 140 and may disable functionality for one or more channels for one or more designated users (e.g., may prevent one or more user computing devices from accessing email, chat, internet, phone, or the like) in step 214.

In step 215, an instruction to modify functionality of one or more channels of communication maybe transmitted to a user computing device, such as local user computing device 150, remote user computing device 170, or the like. Similar to the instruction transmitted in step 213, the instruction may be executed on the computing device and may cause modification of functionality of one or more channels of communication in step 216. For instance, the instruction may be executed by the computing device 150, 170 and may disable functionality such as access to email, access to phone, access to internet, or the like and/or may prevent a user from accessing one or more channels of communication.

FIG. 3 is a flow chart illustrating one example method of implementing a system for dynamically detecting unauthorized activity in a multi-channel system. The processes illustrated in FIG. 3 are merely some example processes and functions. The steps shown may be performed in a different order, more steps may be added, or one or more steps may be omitted without departing from the invention.

In step 300, data may be received via a first channel. For instance, the dynamic unauthorized activity detection computing platform 110 may receive data from multiple different systems associated with various different channels of communication, such as email, telephone conversations, internet or other web activity, chat or instant messaging functions, short message service (SMS), or the like. Data may be received via a first channel of these various channels and may be formatted for further evaluation in step 302. For instance, if the data is received via a telephone system content data received may be converted to natural language and stored, for example, in a text file. In some examples, the text file (or other unstructured format) may be further transformed or formatted to a structured format.

In step 304, the formatted data may be analyzed to determine whether an occurrence of triggering content is detected. For instance, the data may be analyzed to determine whether one or more terms, phrases, or the like, that are associated with unauthorized activity, have been detected. If triggering content is detected, the triggering content may be extracted from the received data and stored for further analysis.

In step 306, data may be received via a second channel, such as a second channel different from the first channel. Accordingly, if the data received and analyzed in steps 300, 302, and 304 was received via a telephone system, the data received in step 306 may be received via a second channel, such as email, chat function, internet or web history, or the like.

In step 308, the data received via the second channel may be formatted. In some examples, formatting the data may include transforming the data from a first, unstructured format to a second, structured format. In step 310, the data received via the second channel may be analyzed to determine whether triggering content is present. If triggering content is present, the triggering content may be extracted and stored for further analysis.

In step 312, the extracted triggering content from the data received via the first channel and the data received via the second channel may be further analyzed. For instance, the machine learning engine may be used to evaluate the extracted terms alone and/or in combination to determine whether a combination of any triggering content from the first channel and triggering content from the second channel indicates potential unauthorized activity. For example, if known malware includes two terms (e.g., Term 1, Term 2), if Term 1 is detected as triggering content from a first channel, and term 2 is detected as triggering content from the second channel, each term alone might not indicate potential unauthorized activity but a combination of the two terms (e.g., occurring within a predetermined time period, such as one hour, one business day, 24 hours, or the like) does. Accordingly, machine learning may be used to evaluate the combinations to determine whether two or more combined terms indicate potential unauthorized activity in step 312.

If the combination does not indicate potential unauthorized activity, the process may return to step 300 and subsequent data may be received via one or more channels. If, in step 312, a combination does indicate potential unauthorized activity, an alert or other notification may be generated and/or transmitted to a computing device for display in step 314.

In step 316, the occurrence of potential unauthorized activity may be evaluated to determine whether it may include a false positive. As discussed herein, in some arrangements, the occurrence of potential unauthorized activity may be given a score or index based on, for example, a user associated with the occurrence, the terms used in the occurrence, a frequency of terms used, and the like. The score may be compared to one or more thresholds and, if below the threshold, it may be considered a false positive. If the score is at or above the threshold, it is likely an occurrence of unauthorized activity.

In step 318, the dynamic unauthorized activity detection computing platform 110 may cause or control modification of operation of one or more channels from which data is received. For instance, the dynamic unauthorized activity detection computing platform 110 may generate an instruction or command that is transmitted to one or more computing systems or devices to prevent access to the first channel, the second channel, or both for one more users, disable functionality of the first channel, second channel or both, or the like. In some examples, access may be prevented for all users while the potential threat is further evaluated.

Figure 4:
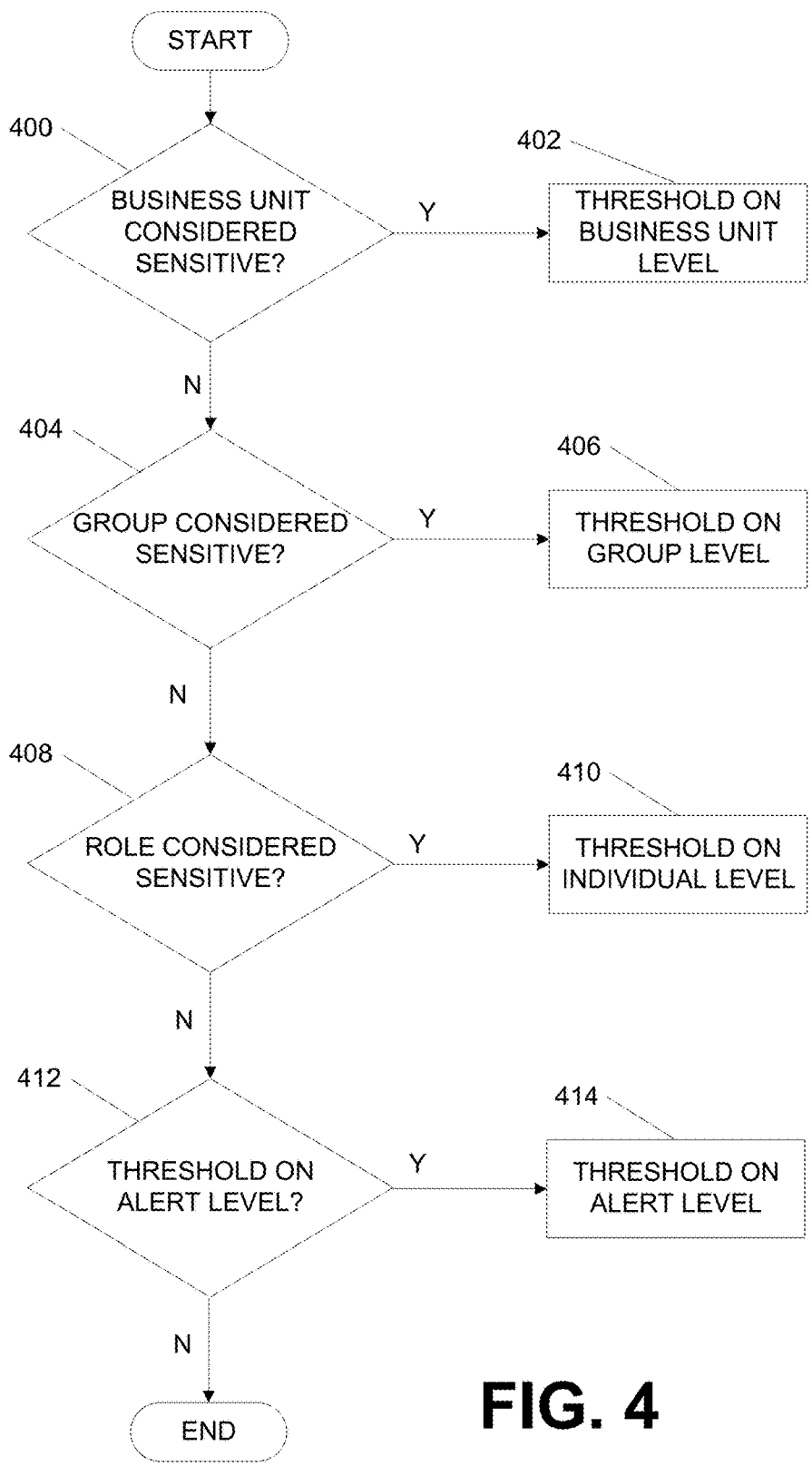
FIG. 4 depicts another illustrative method for implementing and using a system to perform dynamic unauthorized activity detection functions to determine a threshold for evaluating false positives, according to one or more aspects described herein.

FIG. 4 is a flow chart illustrating one example method of implementing a system for dynamically detecting unauthorized activity in a multi-channel system to evaluate a likelihood of an incident including a false positive. The processes illustrated in FIG. 4 are merely some example processes and functions. The steps shown may be performed in a different order, more steps may be added, or one or more steps may be omitted without departing from the invention.

As discussed herein, in some examples, an identified occurrence of potential unauthorized activity may be scored based on various factors, such as a type of user associated with the occurrence, terms used in the occurrence, frequency of terms used, and the like. In some examples, the score may be compared to a threshold to determine whether the occurrence is likely a false positive. As discussed herein, the threshold set may vary based on business unit, group, user or the like. Accordingly, aspects of FIG. 4 illustrate processes associated with determining a threshold for comparison.

In step 400, a determination may be made as to whether a particular business unit is considered sensitive. For instance, the business unit may be evaluated to determine types of information to which the business unit has access, ability of the business unit to modify data, and the like. If, in step 400, the business unit is considered sensitive, in step 402, a threshold may be set based on the business unit (e.g., the entire business unit may have a threshold for evaluating a likelihood of a false positive).

If, in step 400, the business unit is not considered sensitive, a determination may be made in step 404 as to whether a group within the business unit is considered sensitive. For example, while an entire business unit might not have sufficient access to information, or the like, to be considered sensitive, one or more groups within the business unit may access information, modify data, or the like, and be considered sensitive. If so, in step 406, the threshold may be set for the particular group considered sensitive (e.g., the identified group may have a threshold different from the overall business unit).

If, in step 404, the group is not considered sensitive, a determination may be made in step 408 as to whether a role of a particular user is considered sensitive. For example, while an overall group or business unit might not have sufficient access to information or the like to be considered sensitive, one or more users within a group may have a role that gives them access to certain data, permits modification of certain types of data, or the like. Accordingly, in step 410, the threshold may be set on an individual level (e.g., one or more users may have a threshold different from the group and/or business unit of which they are a part).

If, in step 408, the role of the individual is not considered sensitive, a determination may be made in step 412 as to whether thresholds should be set on an alert level. If so, in step 414, the threshold may be set on the alert level.

Figure 5:
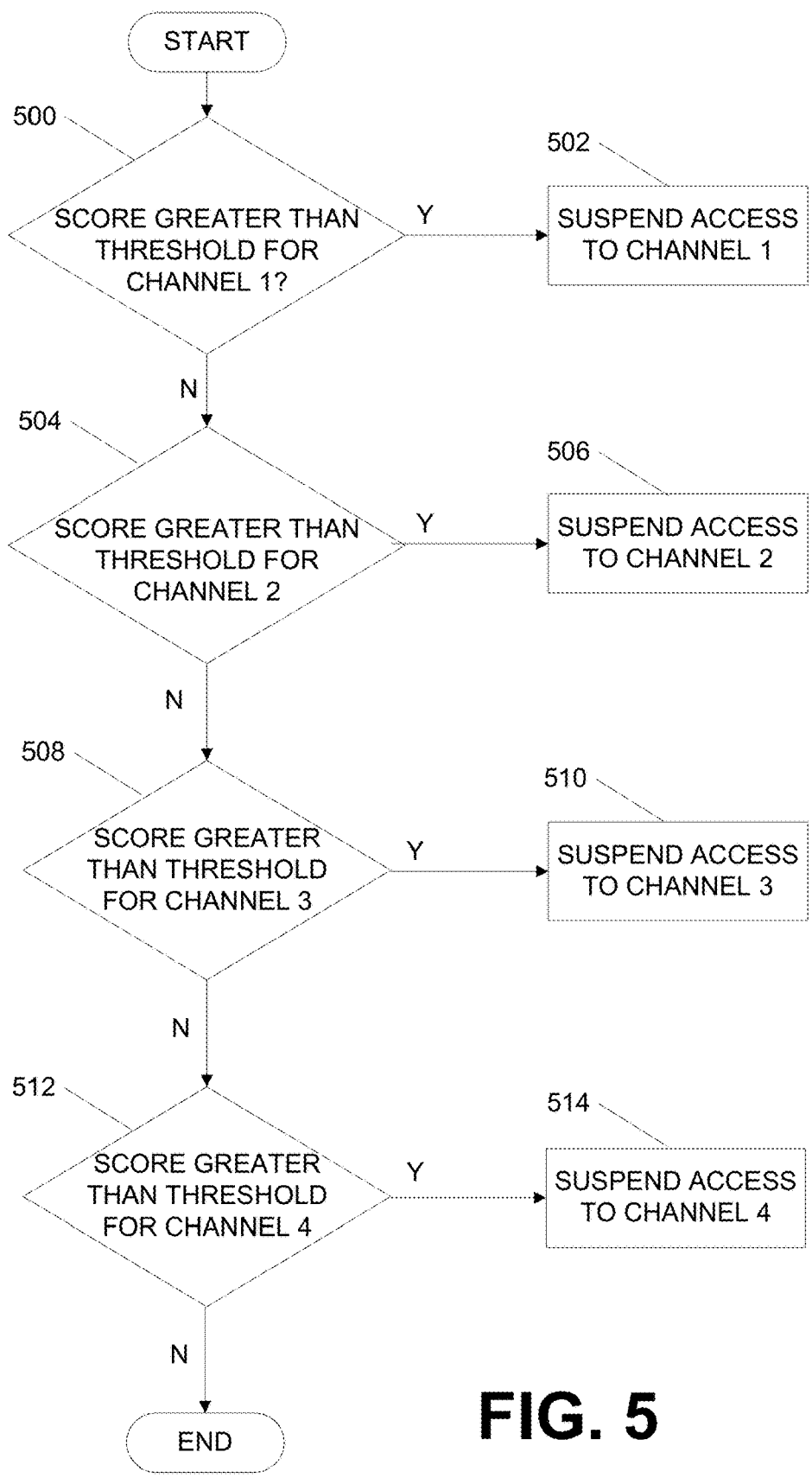
FIG. 5 depicts an illustrative method for implementing and using a system for to perform dynamic unauthorized activity detection to determine whether to modify functionality of one or more channels of communication for one or more users, according to one or more aspects described herein.

FIG. 5 is a flow chart illustrating one example method of implementing a system for dynamically detecting unauthorized activity in a multi-channel system to determine whether to modify functionality of one or more channels of communication for one or more users. The processes illustrated in FIG. 5 are merely some example processes and functions. The steps shown may be performed in a different order, more steps may be added, or one or more steps may be omitted without departing from the invention.

As discussed herein, an occurrence of potential unauthorized activity may be scored based on a user associated with the activity, terms used in the activity, frequency of terms used, and the like. This score may be compared to a threshold (e.g., a second threshold different from the threshold to determine a likelihood of false positive) to determine whether functionality of one or more channels of communication for one or more users should be modified (e.g., prevented, disabled, or the like). In some examples, the functionality may be modified automatically (e.g., without user input or interaction).

In step 500, a determination may be made as to whether the score for the occurrence is greater than a threshold for channel 1. For instance, each channel of communication may have a different threshold for causing modification which may allow more sensitive channels of communication, such as a telephone, to be disabled more often, more quickly, or the like. If the score is greater than the threshold for channel 1, in step 502, the functionality of channel 1 for one or more users may be modified. For instance, access to channel 1 may be suspended, prevented or the functionality may be disabled.

If, in step 500, the score for the occurrence is not greater than the threshold for channel 1, a determination may be made in step 504 as to whether the score for the occurrence is greater than a threshold for channel 2. If the score is greater than the threshold for channel 2, in step 506, the functionality of channel 2 for one or more users may be modified. For instance, access to channel 2 may be suspended, prevented or the functionality may be disabled.

If, in step 504, the score for the occurrence is not greater than the threshold for channel 2, a determination may be made in step 508 as to whether the score for the occurrence is greater than a threshold for channel 3. If the score is greater than the threshold for channel 3, in step 510, the functionality of channel 3 for one or more users may be modified. For instance, access to channel 3 may be suspended, prevented or the functionality may be disabled.

If, in step 508, the score for the occurrence is not greater than the threshold for channel 3, a determination may be made in step 512 as to whether the score for the occurrence is greater than a threshold for channel 4. If the score is greater than the threshold for channel 4, in step 514 the functionality of channel 3 for one or more users may be modified. For instance, access to channel 4 may be suspended, prevented or the functionality may be disabled.

Accordingly, the arrangements described herein provide for a dynamic, real-time evaluation of data from multiple different channels to determine whether unauthorized activity has occurred or may occur. Use of machine learning aids in enabling accurate evaluation of received data and efficient, real-time analysis of the data to identify potential threats or occurrences of unauthorized activity. Accordingly, the systems and arrangements described herein can efficiently detect a potential threat, determine whether the threat is a false positive and, if not, modify functionality of one or more channels of communication in order to quickly minimize an impact of the occurrence of unauthorized activity.

As discussed herein, aspects of the arrangements provide the ability to efficiently and accurately evaluate data across a plurality of different channels of communication to identify combinations of terms that may indicate unauthorized activity. For instance, a particular type of unauthorized activity is commonly referred to by a three word name "Name1 Name2 Name3." Arrangements described herein use machine learning to enable systems to monitor various channels of communication and, if each term appears in one or more channels of communication, identify the potential unauthorized activity. For example, if a user includes "Name2" in an email, "Name1" in an instant message and browsing history includes "Name3," an occurrence of potential unauthorized activity may be identified.

In another example, if current market news indicates a particular performance of a particular asset and a user conducts an internet search related to that type of asset, the performance, or the like, the combination of the market news and the internet browsing information may cause the incident to be identified as potential unauthorized activity.

The examples provided herein are merely some examples of detection of unauthorized activity performed by the systems described herein. Various other types of unauthorized activity and combinations of detection may be used without departing from the invention.

Figure 6:
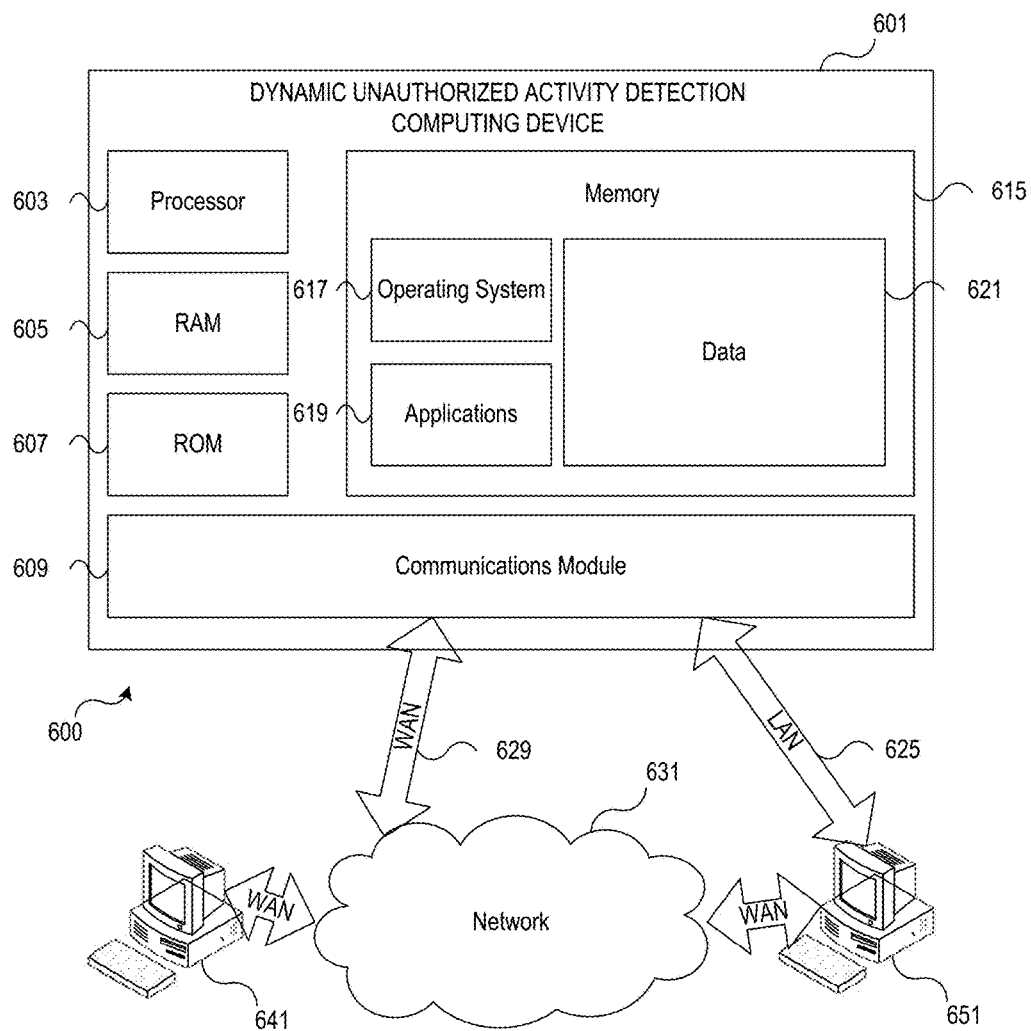
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic unauthorized activity detection computing device 601 having processor 603 for controlling overall operation of dynamic unauthorized activity detection computing device 601 and its associated components, including Random Access Memory (RAM) 605, Read-Only Memory (ROM) 607, communications module 609, and memory 615. Dynamic unauthorized activity detection computing device 601 may include a variety of computer readable media. Computer readable media may be any available media that may be accessed by dynamic unauthorized activity detection computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic unauthorized activity detection computing device 601. Such a processor may execute computer-executable instructions stored on a computer-readable medium.

Software may be stored within memory 615 and/or storage to provide instructions to processor 603 for enabling unauthorized activity detection computing device 601 to perform various functions. For example, memory 615 may store software used by dynamic unauthorized activity detection computing device 601, such as operating system 617, application programs 619, and associated database 621. Also, some or all of the computer executable instructions for dynamic unauthorized activity detection computing device 601 may be embodied in hardware or firmware. Although not shown, RAM 605 may include one or more applications representing the application data stored in RAM 605 while dynamic unauthorized activity detection computing device 601 is on and corresponding software applications (e.g., software tasks) are running on dynamic unauthorized activity detection computing device 601.

Communications module 609 may include a microphone, keypad, touch screen, and/or stylus through which a user of dynamic unauthorized activity detection computing device 601 may provide input, and may also include one or more of a speaker for providing audio output and a video display device for providing textual, audiovisual and/or graphical output. Computing system environment 600 may also include optical scanners (not shown). Exemplary usages include scanning and converting paper documents, e.g., correspondence, receipts, and the like, to digital files.

Dynamic unauthorized activity detection computing device 601 may operate in a networked environment supporting connections to one or more remote computing devices, such as computing devices 641 and 651. Computing devices 641 and 651 may be personal computing devices or servers that include any or all of the elements described above relative to dynamic unauthorized activity detection computing device 601.

The network connections depicted in FIG. 6 may include Local Area Network (LAN) 625 and Wide Area Network (WAN) 629, as well as other networks. When used in a LAN networking environment, dynamic unauthorized activity detection computing device 601 may be connected to LAN 625 through a network interface or adapter in communications module 609. When used in a WAN networking environment, dynamic unauthorized activity detection computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
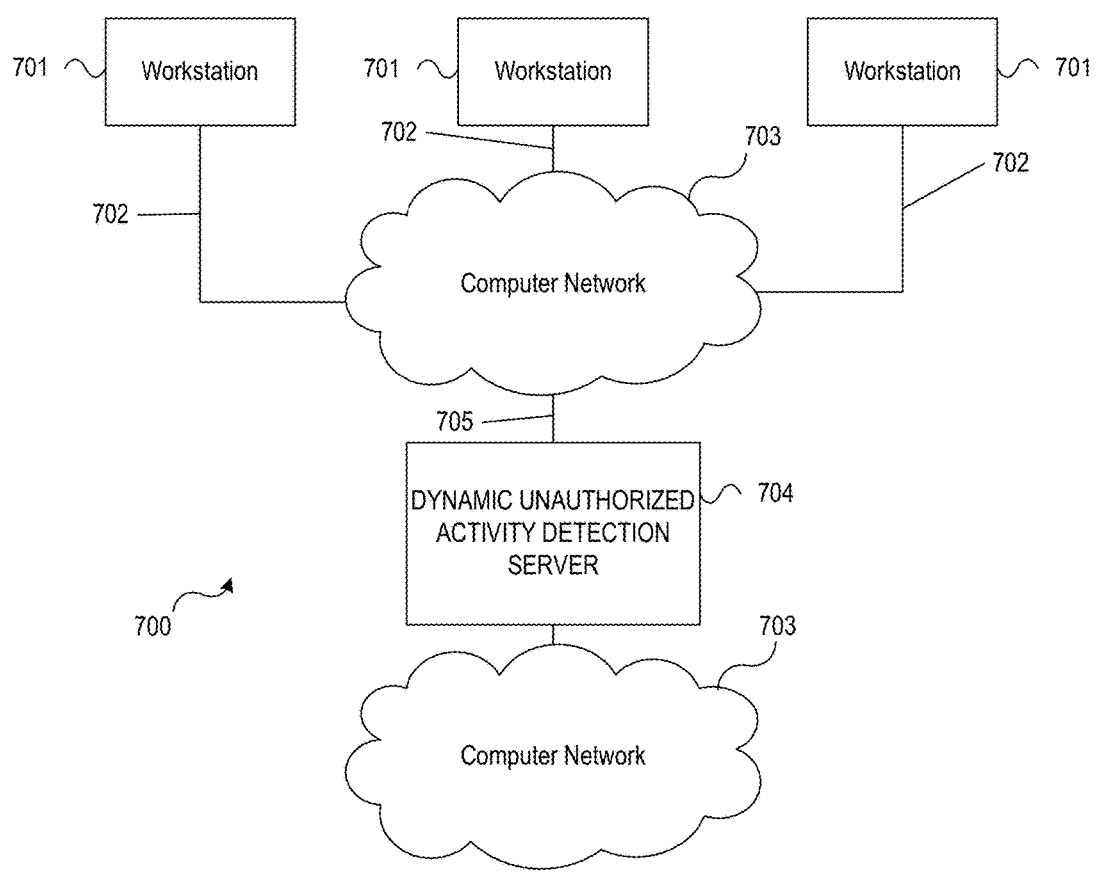
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic unauthorized activity detection server 704. In system 700, dynamic unauthorized activity detection server 704 may be a server, processor, computer, or data processing device, or combination of the same, configured to perform the functions and/or processes described herein. Server 704 may be used to receive data, identify triggering events or terms that may indicate unauthorized activity, use machine learning to evaluate terms to determine whether there is a potential occurrence of unauthorized activity, evaluate the occurrence for a potential false positive, modify functionality of one or more channels of communication, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic unauthorized activity detection server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic unauthorized activity detection computing platform, comprising:
   at least one processor;
   a communication interface communicatively coupled to the at least one processor; and
   memory storing computer-readable instructions that, when executed by the at least one processor, cause the dynamic unauthorized activity detection computing platform to:
     receive first data from a first communication channel;
     format the first data received from the first communication channel;
     analyze the formatted first data received from the first communication channel to identify a first occurrence of triggering content;

receive second data from a second communication channel different from the first communication channel;
format the second data received from the second communication channel;
analyze the formatted second data received from the second communication channel to identify a second occurrence of triggering content;
evaluate, based on one or more machine learning datasets, the first occurrence of triggering content and the second occurrence of triggering content to determine whether triggering content of the first occurrence, in combination with triggering content of the second occurrence, indicates unauthorized activity;
responsive to determining that the triggering content of the first occurrence in combination with the triggering content of the second occurrence indicates unauthorized activity, modifying operation of at least one of the first communication channel and the second communication channel; and
responsive to determining that the triggering content of the first occurrence in combination with the triggering content of the second occurrence does not indicate unauthorized activity, receive subsequent data from at least one of the first communication channel and the second communication channel.

2. The dynamic unauthorized activity detection computing platform of claim 1, further including instructions that, when executed, cause the dynamic unauthorized activity detection computing platform to:
responsive to determining that the triggering content of the first occurrence in combination with the triggering content of the second occurrence indicates unauthorized activity, evaluating the indicated unauthorized activity to determine whether a false positive has occurred.

3. The dynamic unauthorized activity detection computing platform of claim 1, wherein evaluating, based on one or more machine learning datasets, the first occurrence of triggering content and the second occurrence of triggering content to determine whether triggering content of the first occurrence, in combination with triggering content of the second occurrence, indicates unauthorized activity includes determining whether the triggering content of the second occurrence occurred within a predetermined time period of the triggering content of the first occurrence.

4. The dynamic unauthorized activity detection computing platform of claim 1, wherein the first communication channel includes one of: telephone, email, instant messaging and internet browsing.

5. The dynamic unauthorized activity detection computing platform of claim 4, wherein the second communication channel is another of: telephone, email, instant messaging and internet browsing.

6. The dynamic unauthorized activity detection computing platform of claim 1, wherein formatting the first data and the second data includes transforming the first data and the second data from an unstructured format to a structured format.

7. The dynamic unauthorized activity detection computing platform of claim 1, wherein modifying operation of at least one of the first communication channel and the second communication channel includes executing an instruction to prevent access to the at least one of the first communication channel and the second communication channel for a user.

8. The dynamic unauthorized activity detection computing platform of claim 1, wherein modifying operation of at least one of the first communication channel and the second communication channel includes executing an instruction to disable functionality of the at least one of the first communication channel and the second communication channel for a user.

9. A method, comprising:
at a computing platform comprising at least one processor, memory, and a communication interface:
receiving, by the at least one processor and via the communication interface, first data from a first communication channel;
formatting, by the at least one processor, the first data received from the first communication channel;
analyzing, by the at least one processor, the formatted first data received from the first communication channel to identify a first occurrence of triggering content;
receiving, by the at least one processor and via the communication interface, second data from a second communication channel different from the first communication channel;
formatting, by the at least one processor, the second data received from the second communication channel;
analyzing, by the at least one processor, the formatted second data received from the second communication channel to identify a second occurrence of triggering content;
evaluating, by the at least one processor and based on one or more machine learning datasets, the first occurrence of triggering content and the second occurrence of triggering content to determine whether triggering content of the first occurrence, in combination with triggering content of the second occurrence, indicates unauthorized activity; and
responsive to determining that the triggering content of the first occurrence in combination with the triggering content of the second occurrence indicates unauthorized activity, modifying, by the at least one processor, operation of at least one of the first communication channel and the second communication channel.

10. The method of claim 9, further including:
responsive to determining that the triggering content of the first occurrence in combination with the triggering content of the second occurrence indicates unauthorized activity, evaluating, by the at least one processor, the indicated unauthorized activity to determine whether a false positive has occurred.

11. The method of claim 9, wherein evaluating, by the at least one processor and based on one or more machine learning datasets, the first occurrence of triggering content and the second occurrence of triggering content to determine whether triggering content of the first occurrence, in combination with triggering content of the second occurrence, indicates unauthorized activity includes determining, by the at least one processor, whether the triggering content of the second occurrence occurred within a predetermined time period of the triggering content of the first occurrence.

12. The method of claim 9, wherein the first communication channel includes one of: telephone, email, instant messaging and internet browsing.

13. The method of claim 12, wherein the second communication channel is another of: telephone, email, instant messaging and internet browsing.

14. The method of claim 9, wherein formatting the first data and the second data includes transforming, by the at least one processor, the first data and the second data from an unstructured format to a structured format.

15. The method of claim 9, wherein modifying operation of at least one of the first communication channel and the second communication channel includes executing an instruction to prevent access to the at least one of the first communication channel and the second communication channel for a user.

16. The method of claim 9, wherein modifying operation of at least one of the first communication channel and the second communication channel includes executing an instruction to disable functionality of the at least one of the first communication channel and the second communication channel for a user.

17. One or more non-transitory computer-readable media storing instructions that, when executed by a computing platform comprising at least one processor, memory, and a communication interface, cause the computing platform to:
receive first data from a first communication channel;
format the first data received from the first communication channel;
analyze the formatted first data received from the first communication channel to identify a first occurrence of triggering content;
receive second data from a second communication channel different from the first communication channel;
format the second data received from the second communication channel;
analyze the formatted second data received from the second communication channel to identify a second occurrence of triggering content;
evaluate, based on one or more machine learning datasets, the first occurrence of triggering content and the second occurrence of triggering content to determine whether triggering content of the first occurrence, in combination with triggering content of the second occurrence, indicates unauthorized activity;
responsive to determining that the triggering content of the first occurrence in combination with the triggering content of the second occurrence indicates unauthorized activity, modifying operation of at least one of the first communication channel and the second communication channel; and
responsive to determining that the triggering content of the first occurrence in combination with the triggering content of the second occurrence does not indicate unauthorized activity, receive subsequent data from at least one of the first communication channel and the second communication channel.

18. The one or more non-transitory computer-readable media of claim 17, further including instructions that, when executed, cause the computing platform to:
responsive to determining that the triggering content of the first occurrence in combination with the triggering content of the second occurrence indicates unauthorized activity, evaluating the indicated unauthorized activity to determine whether a false positive has occurred.

19. The one or more non-transitory computer-readable media of claim 17, wherein evaluating, based on one or more machine learning datasets, the first occurrence of triggering content and the second occurrence of triggering content to determine whether triggering content of the first occurrence, in combination with triggering content of the second occurrence, indicates unauthorized activity includes determining whether the triggering content of the second occurrence occurred within a predetermined time period of the triggering content of the first occurrence.

20. The one or more non-transitory computer-readable media of claim 17, wherein the first communication channel includes one of: telephone, email, instant messaging and internet browsing.

21. The one or more non-transitory computer-readable media of claim 20, wherein the second communication channel is another of: telephone, email, instant messaging and internet browsing.

22. The one or more non-transitory computer-readable media of claim 17, wherein formatting the first data and the second data includes transforming the first data and the second data from an unstructured format to a structured format.

23. The one or more non-transitory computer-readable media of claim 17, wherein modifying operation of at least one of the first communication channel and the second communication channel includes executing an instruction to prevent access to the at least one of the first communication channel and the second communication channel for a user.

24. The one or more non-transitory computer-readable media of claim 17, wherein modifying operation of at least one of the first communication channel and the second communication channel includes executing an instruction to disable functionality of the at least one of the first communication channel and the second communication channel for a user.

* * * * *

UNITED STATES PATENT AND TRADEMARK OFFICE
CERTIFICATE OF CORRECTION

PATENT NO. : 10,397,252 B2  
APPLICATION NO. : 15/782933  
DATED : August 27, 2019  
INVENTOR(S) : Awadhesh Pratap Singh Page 1 of 1

It is certified that error appears in the above-identified patent and that said Letters Patent is hereby corrected as shown below:

On the Title Page

Column 1, (72) Inventor, Line 1:  
Before "Telangana", insert --Hyderabad,--

Signed and Sealed this  
Tenth Day of November, 2020

Andrei Iancu  
*Director of the United States Patent and Trademark Office*